United States Patent [19]
Walde

[11] Patent Number: 5,934,721
[45] Date of Patent: Aug. 10, 1999

[54] MULTI-FUNCTION ADJUSTABLE GRIP BARBECUE TONG ASSEMBLY

[76] Inventor: Armin Walde, 2393 Westlake Ave., Oceanside, N.Y. 11572

[21] Appl. No.: 09/089,979

[22] Filed: Jun. 3, 1998

[51] Int. Cl.$^6$ ..................................................... A47J 43/28
[52] U.S. Cl. .................................. 294/3; 294/7; 294/99.2; 30/123
[58] Field of Search ................................ 294/3, 7, 8, 8.5, 294/9, 10, 11, 33, 99.2; 30/123, 148–150; 7/109, 110, 113

[56] References Cited

U.S. PATENT DOCUMENTS

| | | | |
|---|---|---|---|
| D. 194,113 | 11/1962 | Page ............................................. | 294/7 |
| 389,925 | 9/1888 | Griscom .................................. | 294/99.2 |
| 749,110 | 1/1904 | Spangler . | |
| 1,133,334 | 3/1915 | Strycker .................................. | 294/99.2 |
| 1,484,100 | 2/1924 | Wertz . | |
| 1,643,456 | 9/1927 | James ......................................... | 294/3 |
| 1,723,597 | 8/1929 | Bannister .............................. | 294/99.2 |
| 2,362,395 | 11/1944 | Ozdobinski .............................. | 294/8.5 |
| 2,455,623 | 12/1948 | Stone ........................................ | 294/3 |
| 2,573,922 | 11/1951 | Meyer ........................................ | 294/7 |
| 2,747,911 | 5/1956 | Kuever ....................................... | 294/7 |
| 2,892,655 | 6/1959 | Bower . | |
| 3,213,779 | 10/1965 | First . | |
| 3,361,468 | 1/1968 | Case . | |
| 3,964,775 | 6/1976 | Boyd . | |
| 4,002,365 | 1/1977 | Rader . | |
| 4,471,985 | 9/1984 | Mahoney .................................. | 294/10 |
| 4,848,816 | 7/1989 | Anderson .................................... | 294/7 |
| 5,601,323 | 2/1997 | Kaiser . | |

FOREIGN PATENT DOCUMENTS

| | | | |
|---|---|---|---|
| 1442322 | 7/1976 | United Kingdom ....................... | 294/7 |

*Primary Examiner*—Dean J. Kramer
*Attorney, Agent, or Firm*—Michael I. Kroll

[57] ABSTRACT

The multi-functional adjustable grip barbeque tong assembly 10 has an adjustable separation limiter 16 that controls how far apart the handles 14 are to conform to the users needs, a dual-spatula tong system for grabbing and turning food, beveled cutting edges 44 on the spatula plates 23, 25, tines 30 that fit between and below the rods of a barbeque grill 36 to get underneath food 38 to better lift it, and recesses 31 to scrape the grill 36 clean. The dual spatula assemblies 24, 26 are connected to one another by a spring action U-clip 11 that has a limiting bolt 17 running through the two legs. The further that the limiting bolt 17 is threaded into a threaded aperture 50 the closer the two legs are pulled together thereby also decreasing the distance between the connected handles 14 making the tongs 10 easier to manage.

10 Claims, 9 Drawing Sheets

MULTI-FUNCTION ADJUSTABLE GRIP BARBECUE TONG ASSEMBLY

BACKGROUND OF THE INVENTION

1. Field of the Invention

The present invention relates generally to cooking utensils, and more specifically to a dual-spatula tong system with adjustably separated handles, blade-like cutting edges along the spatulas, and tines extending from the front edge of one spatula. The tines slide between and beyond the bars of a barbeque grill permitting the user to more effectively slide under and lift a grilling piece of food as the sharpened grooves between the tines scrape the grill clean as it's being used.

2. Description of the Prior Art

There are many cooking utensils utilizing tongs in the prior art, for example, U.S. Pat. No. 5,601,323 issued to Armand A. Kaiser on Feb. 11, 1997 describes a cooking tong apparatus for handling food items on a grill, the cooking tong apparatus having first and second jaws disposed in opposing gripping engagement, wherein the jaws open and close in a vertical direction and each jaw has a plurality of tines that are properly spaced apart and sized to fit between standard cross members of a grill. The cooking tong apparatus has first and second handles which lie in a substantially horizontal plane, allowing a user to operate cooking tong apparatus in a manner which is most comfortable for the users hand and wrist.

U.S. Pat. No. 4,002,365 issued to James A. Rader on Jan. 11, 1977 describes tongs for handling food items upon a grill in which the food gripping parts of the tongs are displaced laterally as well as apart when opened to enable the user of the tongs to see the food item as it is being gripped by the tongs.

U.S. Pat. No. 3,964,775 issued to Leonard E. Boyd on Jun. 22, 1976 teaches a set of tongs for grasping material utilizing a pair of jaws and a pair of handles correspondingly affixed to the jaws. The handles include hand grips on the ends distal from the jaws and removably pivoted to one another. The jaws have a plurality of tines with lateral extensions to reduce the space between the tines. In addition, the tines may include inward protrusions to stabilize the material grasped by the tongs.

U.S. Pat. No. 3,361,468 issued on Jan. 2 1968 discloses food turning tongs that utilize a unique form of upper and lower gripping means which are substantially parallel to each other when in food pattie holding or turning position, with these upper and lower members each having substantially parallel end portions of rod-like form with the end portions of the upper member being substantially symmetrical with the lower and approximately in alignment with same. The bottom of the lower end portions are preferably chamfered, and the end portions of the upper members sinuous in an up and down direction with a turned-down gripping portion at the free end of same. Said turned-down gripping portion preferably has a turned-up point at its outer end.

U.S. Pat. No. 3,213,779 issued on Oct. 26, 1965 shows a spatula which permits placing the prongs between the wires or rods of the grill and prying and sliding the food onto the flat surface. It does not cut up the food and, at the same time, the prongs of the spatula permit the grease to drain from the meat or other food. Knife edges are formed on each side of the spatula. These knife edges can be used in cooperation with the spatula function of the device to cut meat or other food loose from the grill or griddle.

U.S. Pat. No. 2,892,655 issued on Jun. 30, 1959 describes frankfurter tongs that are over 24 inches long in order to prevent the user from getting burned when cooking over an open fire. Since this is unwieldy to carry and difficult to store, the tongs can fold to approximately one half the length thereof when in use. The improved tongs for handling frankfurters include a pair of tong members which are pivotally mounted on a pivot bolt, a pair of handles which are also pivotally, mounted on the pivot bolt for pivoting independently of the tong members whereby the handles may be disposed generally coaxial with the tong members, and means on the tong members in the form of extensions releasably interlocked with the handles whereby the handles may be selectively used to operate the tong members or swung to stored positions coaxial with the tong members.

U.S. Pat. No. 1,484,100 issued to James C. Wertz on Nov. 1 1920 discloses cinder tongs having two arms pivoted to each other, each arm having spaced apart inwardly curved claws, two handles respectively pivoted to said arms and pivoted to each other, one of the handles on its inner side having a transverse groove, and a u-shaped spring having one of its arms tightly fitted in said groove and having its other arm bearing against the inner side of the other handle.

U.S. Pat. No. 749,110 issued to John H. Spangler on Jan. 5, 1904 shows household tongs comprising a pair of handles towards the one end of each of which is pivotally secured one or more gripping tongs or tines. Theses tongs or tines are carried on shanks having their rear ends slidably connected to the handles. Means is preferably a spring interposed between the handles for normally holding the tongs or tines in the open position.

SUMMARY OF THE PRESENT INVENTION

It is a primary object of the present invention to provide multi-function adjustable grip barbeque tongs which will overcome the shortcomings of prior art devices.

It is another object of the present invention to provide multifunction adjustable grip barbecue tongs with handles that can adjust to a greater or lesser degree of separation to accommodate the size of the users hand or the size of the object being grilled.

It is a further object of the present invention to provide multifunction adjustable grip barbeque tongs with dual spatulas that have beveled cutting edges so the user could slice into a piece of meat in order to check its preparedness with out needing another utensil. The multi-function tongs can make two slices simultaneously since both of the spatula plates have cutting edges effectively reducing by half the time and effort to slice frankfurters, carrots, etc.

It is a still further object of the present invention to provide multifunction adjustable grip barbeque tongs having a spatula plate with distally extending, sharpened tines that are of a width that permits them to slide between and below the cross members of a barbeque grill in order to more effectively get underneath and lift an object that is seared to the grill.

Yet another object of the present invention is to provide multi-function adjustable grip barbeque tongs wherein the grooves between the tines are sharpened so as to scrape clean the cross members of the grill while in use so remnants of the object being cooked do not have the opportunity to harden and make a later cleaning much more difficult. Additional objects of the present invention will appear as the description proceeds.

The novel features which are considered characteristic for the invention are set forth in the appended claims. The invention itself, however, both as to its construction and its method of operation, together with additional objects and advantages thereof, will best be understood in connection with the accompanying drawings. Attention is called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DETAILED DESCRIPTION OF THE PREFERRED EMBODIMENTS

Turning now descriptively to the drawings, in which similar reference characters denote similar elements throughout the several views, the Figures illustrate the composition and structure of the present invention. With regard to the reference numerals used, the following numbering is used throughout the various drawing figures.

Figures 1, 2:
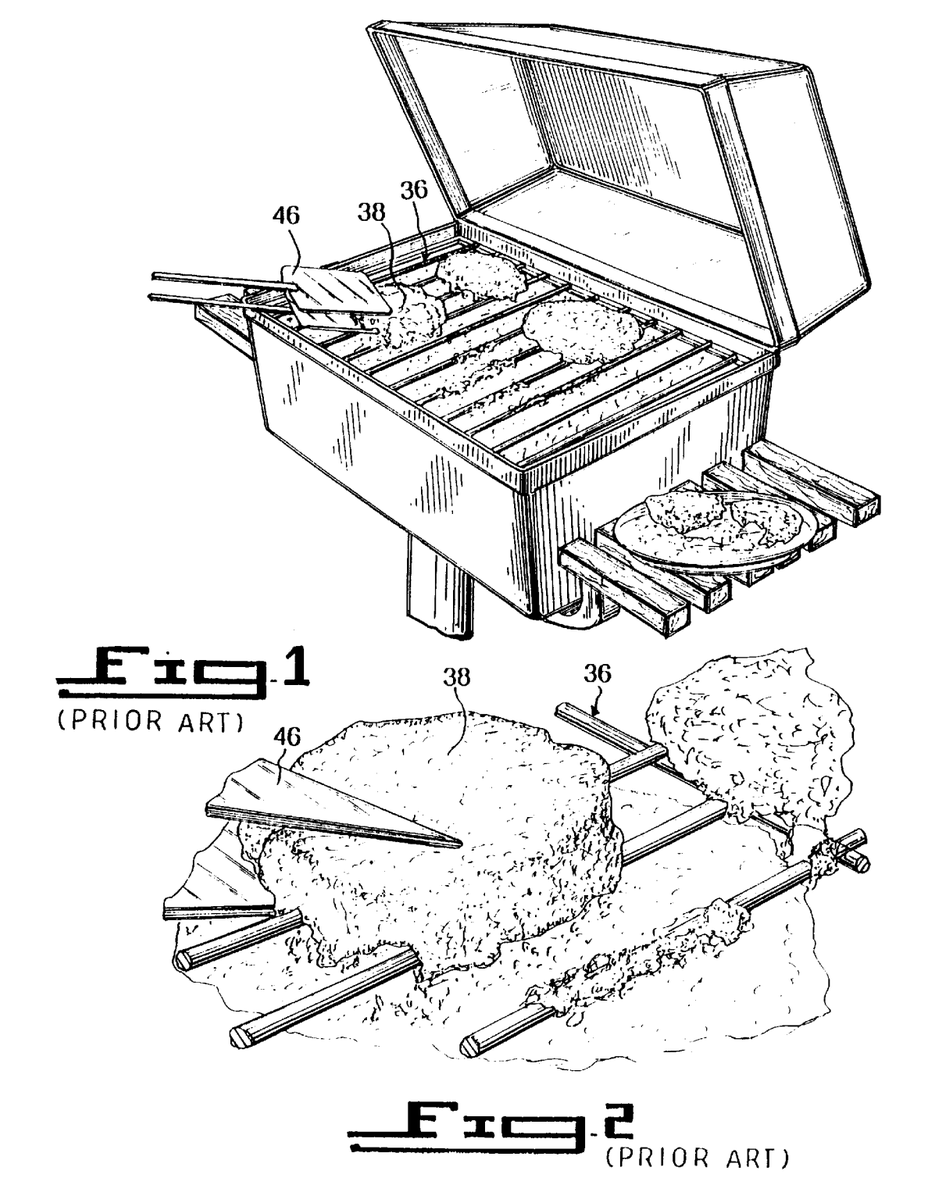
FIG. 1 Is a perspective view of hamburgers on a barbeque grill as shown in the prior art.
FIG. 2 is a perspective view, taken from FIG. 1 as indicated, showing as prior art a hamburger seared to the cross members of a grill with a spatula trying to get underneath it without breaking the burger or pushing it beyond edge of the grill down into the charcoal. Also shown is leftover meat from another hamburger which is hardening into a tough to clean problem.
Figure 3:
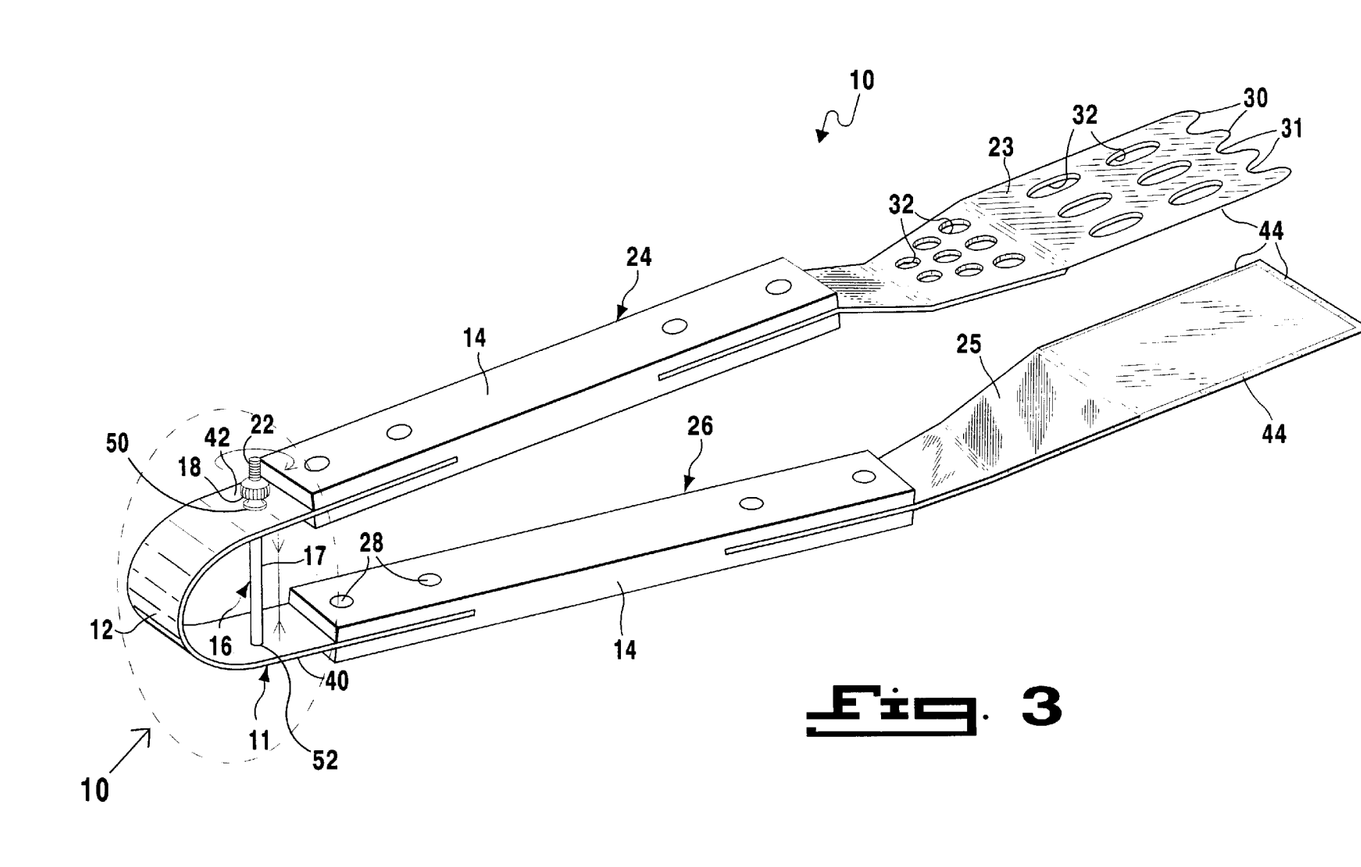
FIG. 3 is a perspective view of the present invention.

10 multi-function adjustable grip barbeque tong assembly
11 spring action u-clip
12 radial fulcrum
14 thermo-resistant handle
16 separation limiter assembly
17 limiting bolt of 16
18 nut of 16
20 washer of 16
21 head of 17
22 threads of 17
23 first plate
24 first spatula assembly
25 second plate
26 second spatula assembly
28 rivet
30 tines
31 tine recesses
32 degreasing apertures
34 hand of user
36 barbecue grill
38 hamburger
40 second leg of 11
42 first leg of 11
44 beveled cutting edge
46 prior tongs
48 stainless steel
50 threaded aperture
52 aperture The present invention relates to a multi-function adjustable grip tong system 10 comprising a spring action u-clip 11 with two ends affixed to thermo-resistant handles 14. Each handle 14 has a plate 23,25 attached to the opposing end forming dual spatula assemblies. Since the handles 14 extend divergently from the spring action u-clip 11, the first spatula plate 23 and the second spatula plate 25 are bent at slight compound angles extending from the handle 14 in order for the greater flat portion of the first plate 23 to be substantially parallel to the greater flat portion of the second plate 25. The u-clip 11 can be made of any resilient material but stainless steel 48 is preferrred. Stainless steel 48 is also preferred for the spatula plates. The handles 14 can be made of any thermo-resistant material although wood is preferred.

Figure 9:
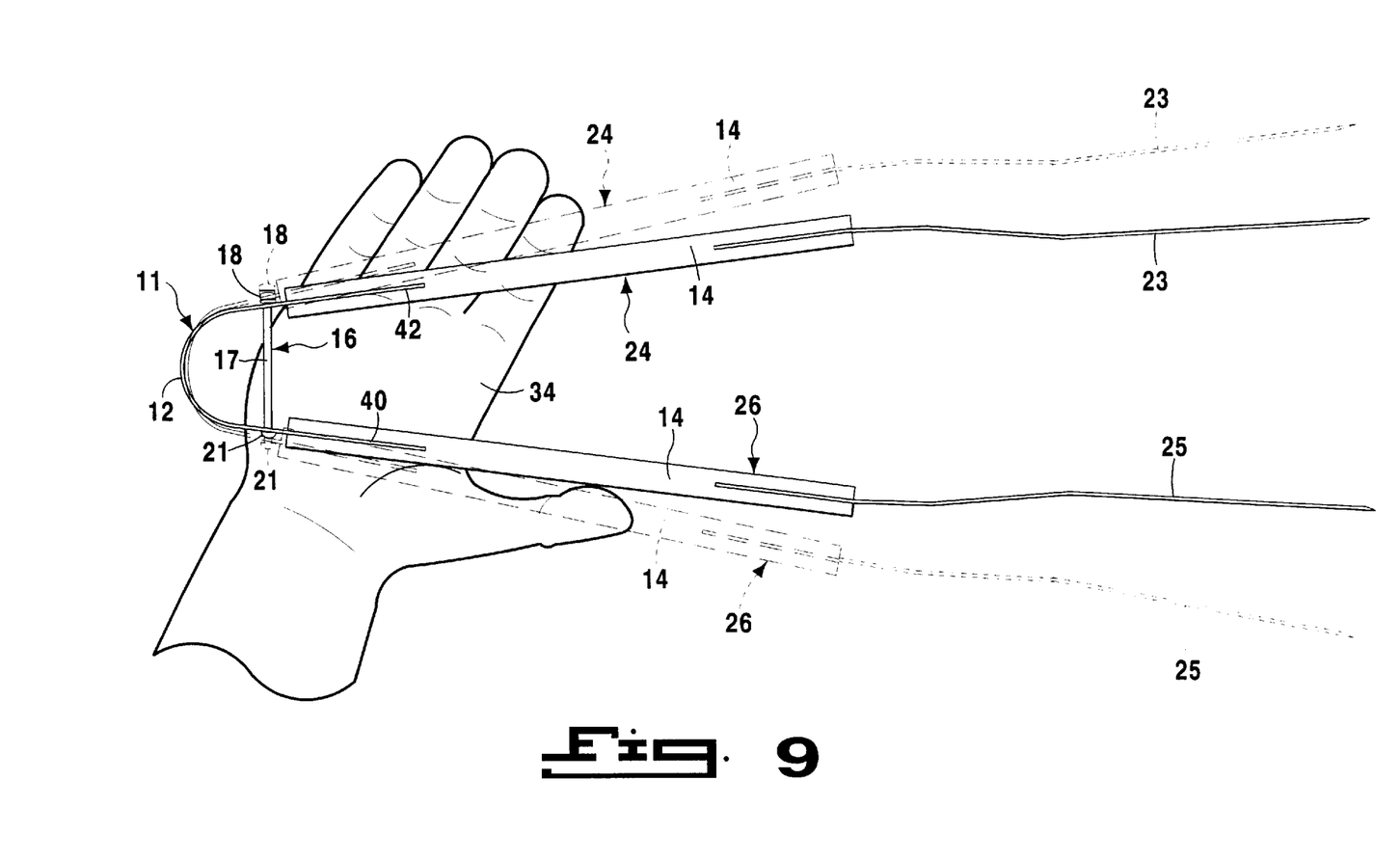
FIG. 9 is a side plan of the present invention in an adjusted state providing a narrower degree of separation between handles.
Figure 10:
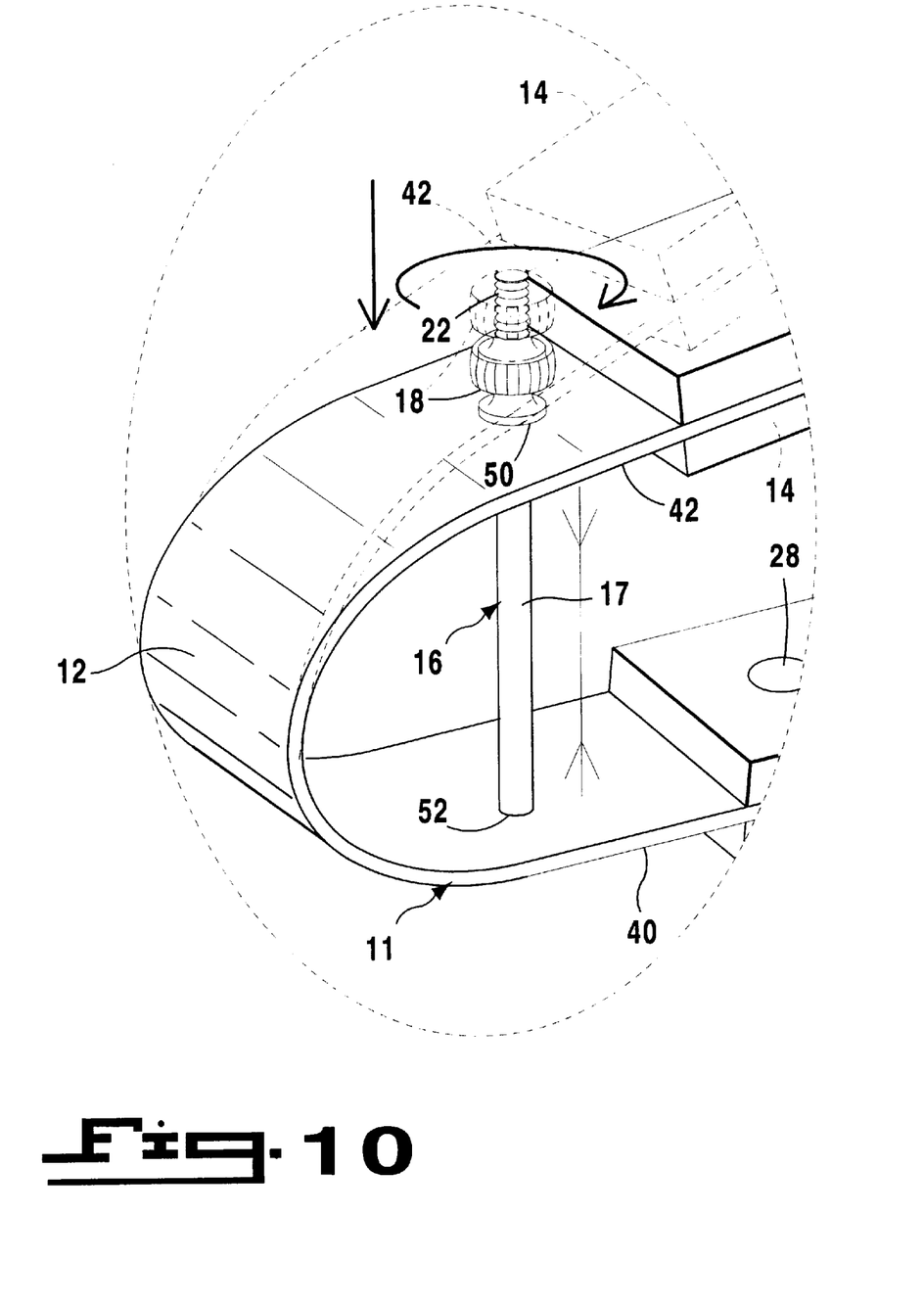
FIG. 10 is a perspective view as taken from FIG. 3 showing the separation limiter assembly after tightening the adjusting bolt in order to bring the legs of the spring action u-clip closer together when the tongs are in a static state. This position also brings the handles closer together making the tongs easier to use for people with smaller hands. The hidden lines indicate the static position prior to adjusting the limiter.

The spring action u-clip 11 includes a resilient radial fulcrum 12 with two straight legs 40,42 roughly forming a u shape, and an adjustable separation limiter assembly 16. The first leg 42 has a centrally located threaded aperture 50 adapted to receive a limiting bolt 17 and the second leg 40 has a smooth, slightly larger, corresponding aperture 52 for maintaining the limiter assembly 16. A limiting bolt 17 is then inserted through the smooth aperture 52 and the threaded end 22 is screwed into the threaded aperture 50. The limiting bolt 17 is fixed on the threaded end and slides through the smooth aperture 52 when the handles 14 are compressed. When the limiting bolt 17 is threaded deeper into the threaded aperture 50 the limiting bolt head 21 pulls and holds the first leg 42 of the u-clip assembly closer to the second leg 40 thereby reducing the degree of separation between the two legs. This, in turn, effectively reduces the degree of separation between the two handles 14 making the tongs 10 easier for someone with smaller hands 34 to manage. A lock washer 20 and/or retaining nut 18 could be added to the threads 22 extending beyond the first leg 42 to further secure the limiting bolt 17.

Figure 4:
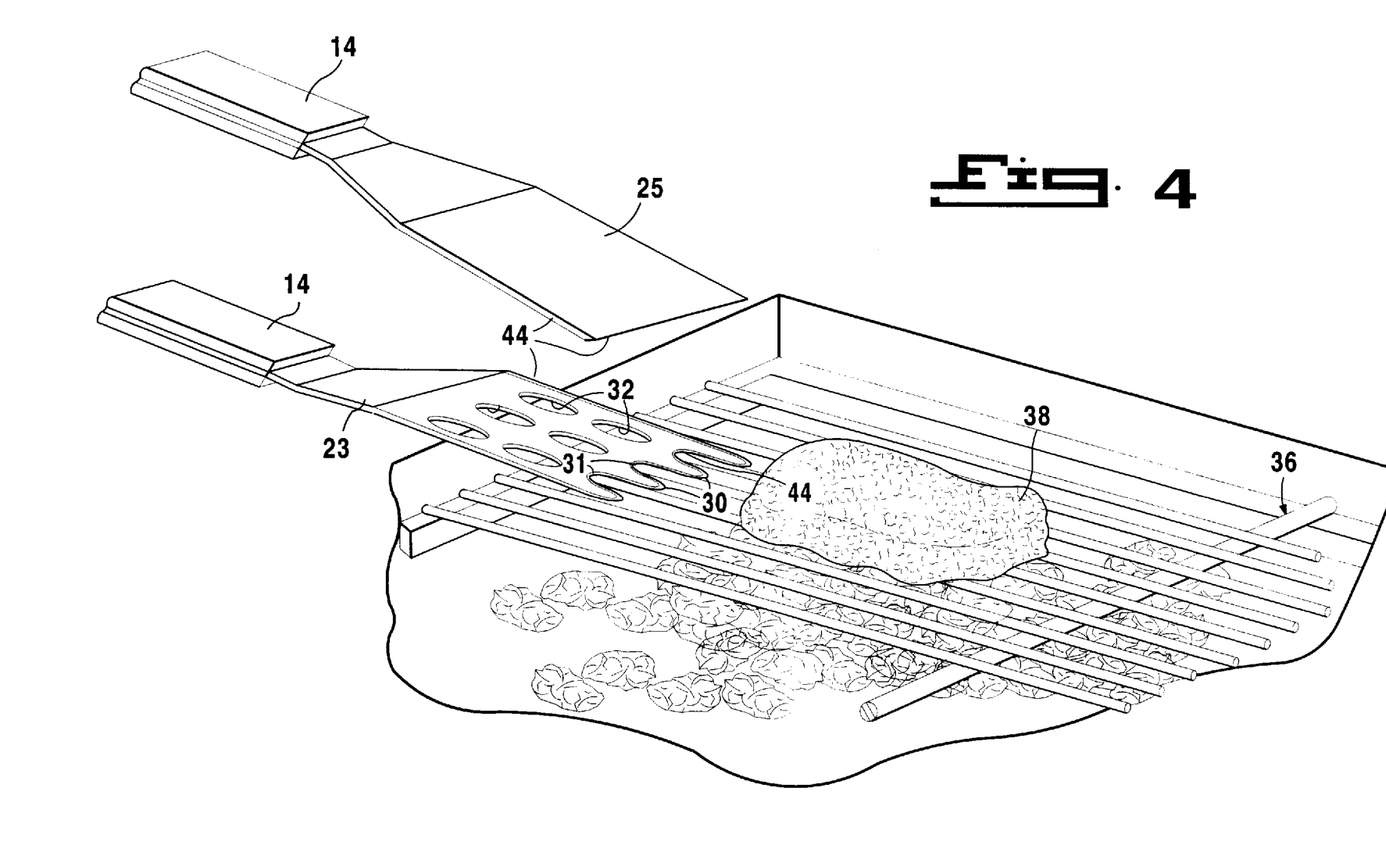
FIG. 4 is a perspective view of the present invention in use in conjunction with a barbeque grill and a hamburger. Cross members of the grill are clean and free of residual meat due to the cleaning and scraping action of the tines and grooves.
Figure 5:
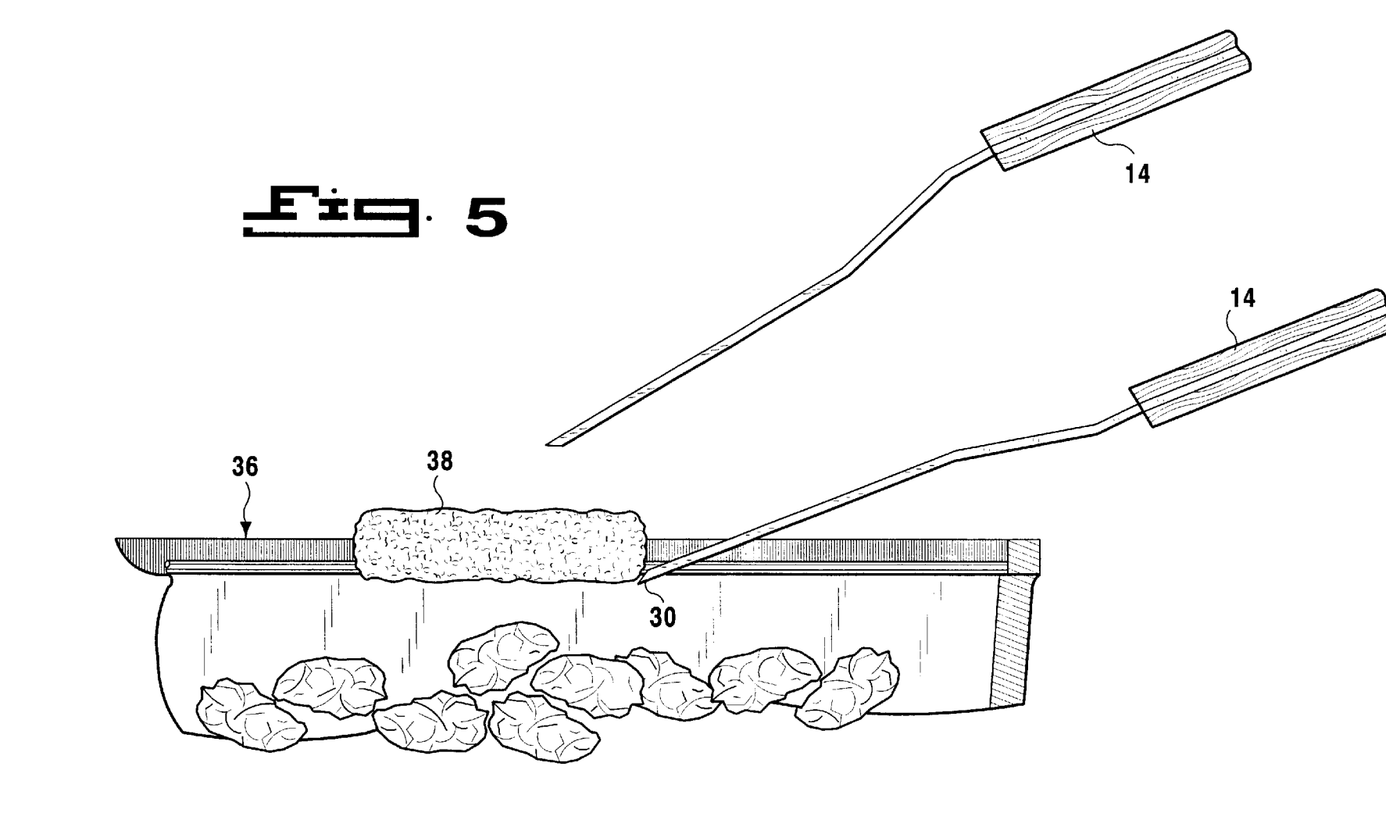
FIG. 5 is a side plan of the present invention in use with a barbeque grill.

The first spatula plate 23 has tines 30 extending longitudinally beyond the distal edge of the plate 23, sufficiently spaced apart and of a width allowing the tines 30 to fit between and below the rods of a barbeque grill 36. The tines 30 can then be slid below the food being cooked, such as a piece of meat 38 seared to the grill, and lifted in a manner that will reduce the chances of breaking up the burger or pushing it into the charcoal below. There are recesses 31 between the tines 30 that ride along the rods of the grill scraping off the residual food and cleaning the grill as the food is being prepared. This is particularly effective because the tines 30 and their recesses 31 have beveled cutting edges 44 as do the two sides of the plate 23. The first plate 23 also contains several degreasing apertures 32 that allows the user to squeeze excessive grease out of the food.

Figure 6:
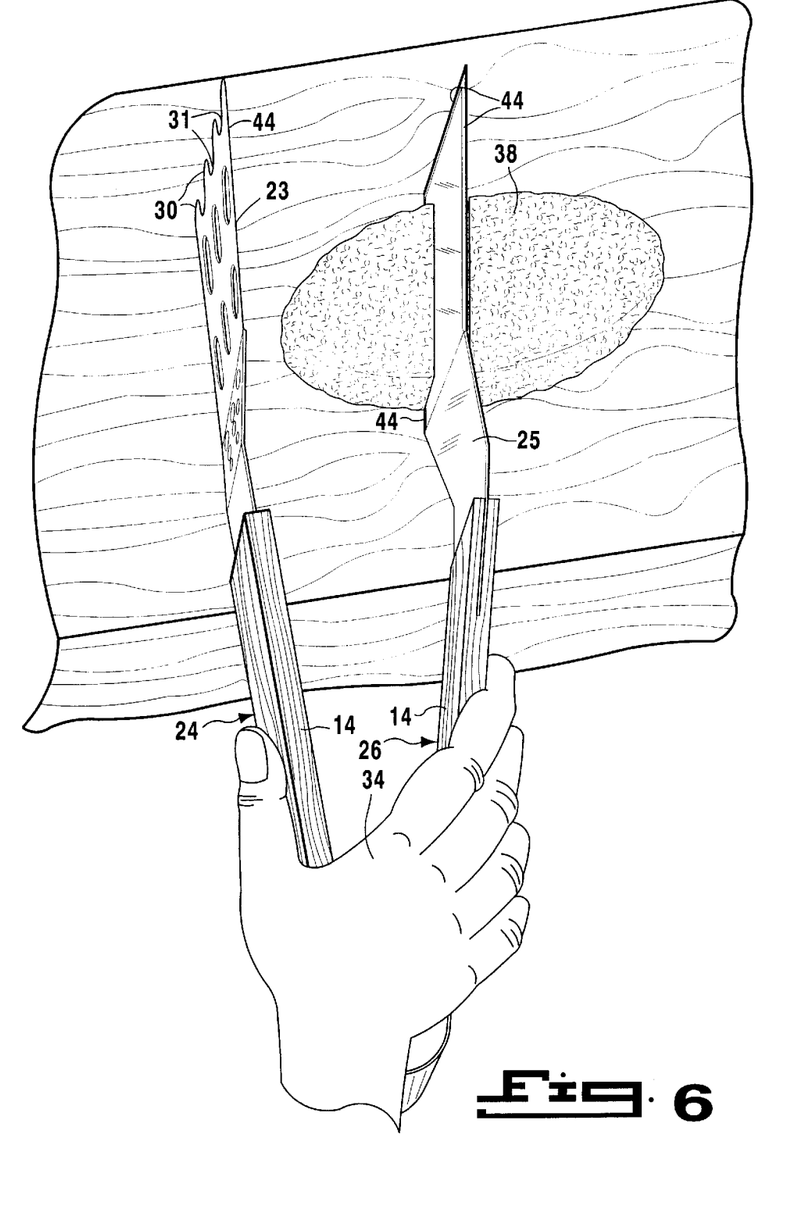
FIG. 6 is a perspective view of the present invention in use as a cutting tool.
Figure 7:
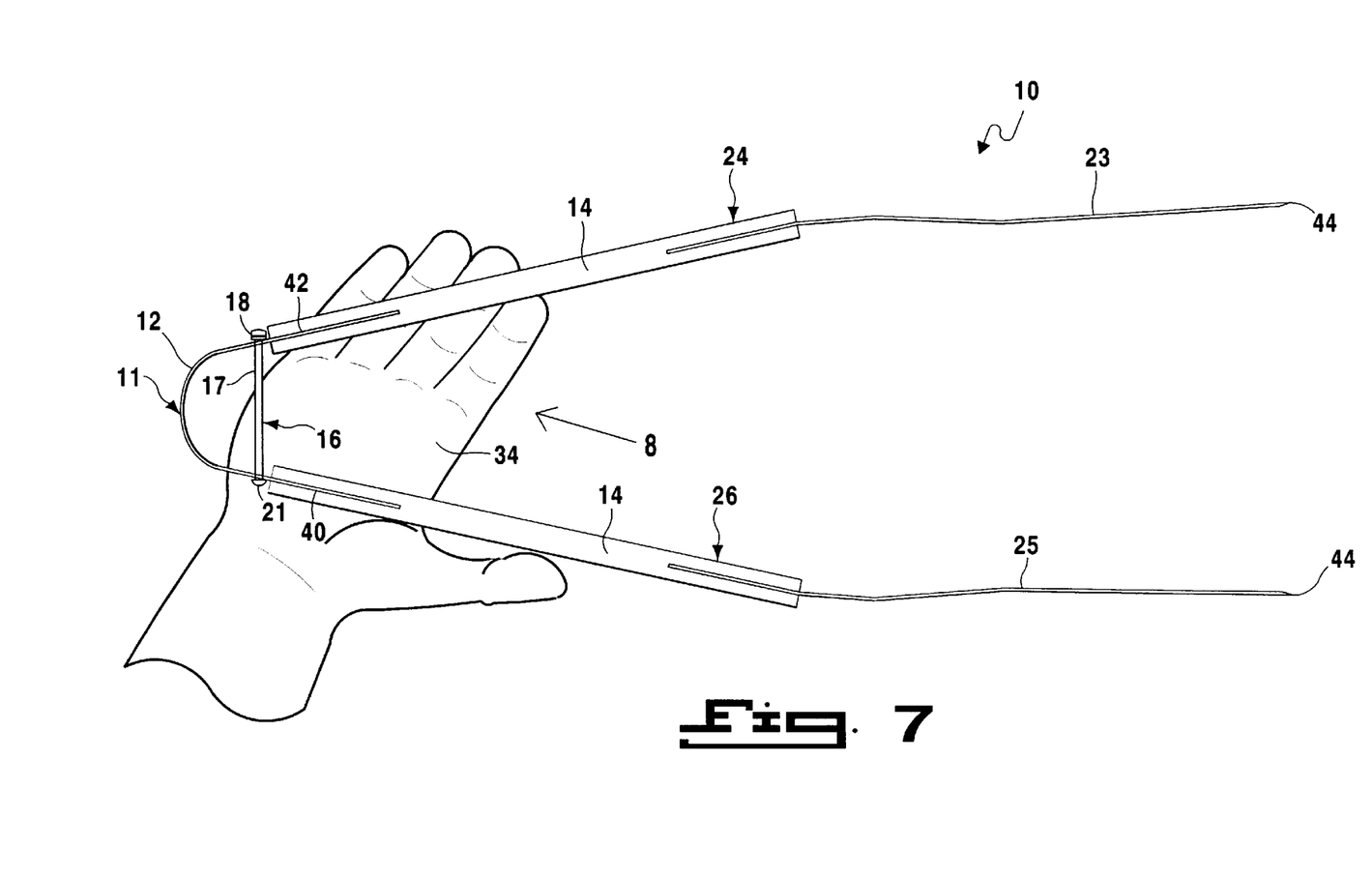
FIG. 7 is a side plan of the present invention within the grasp of a hand showing proper positioning and adjustment.
Figure 8:
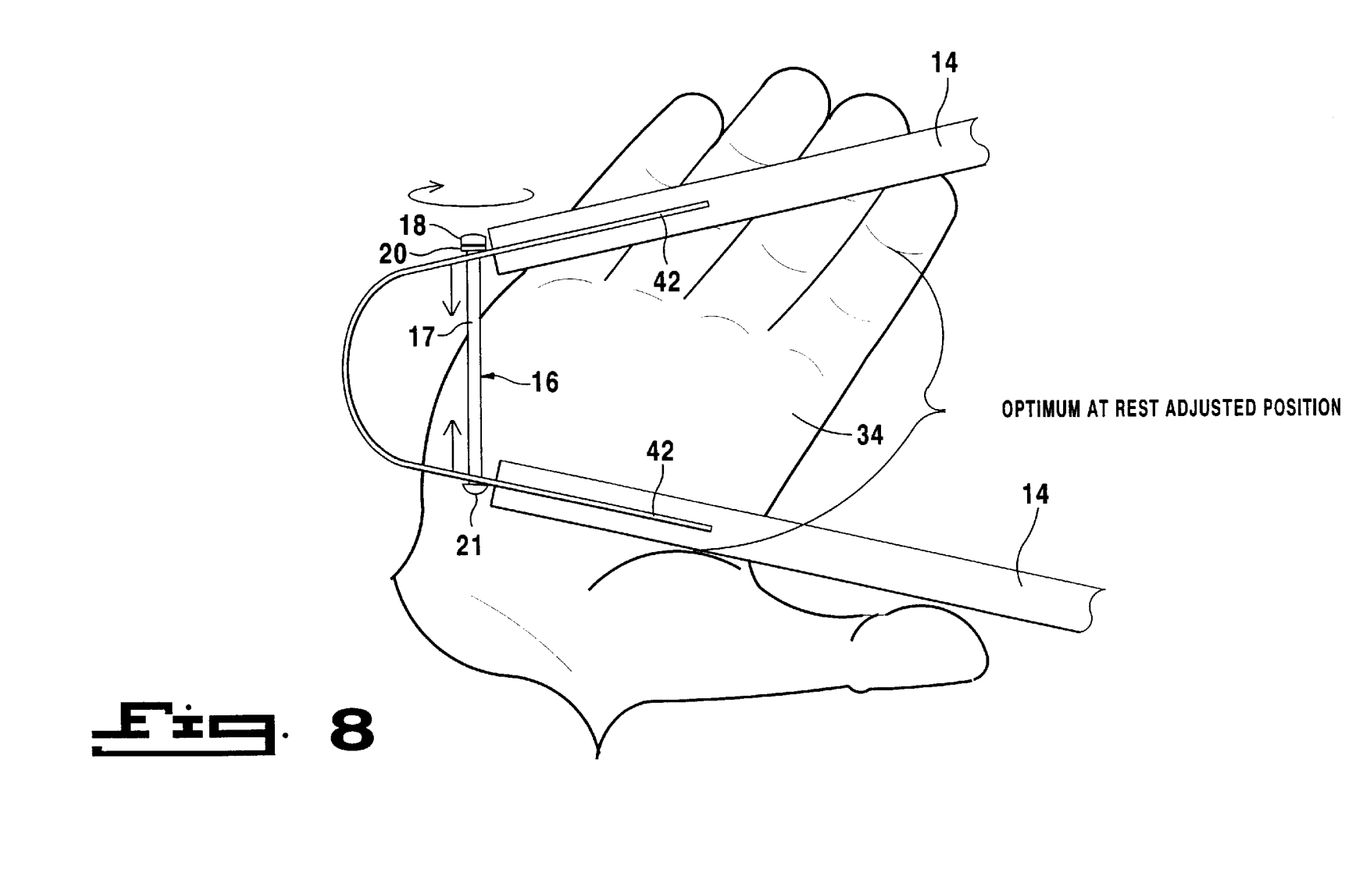
FIG. 8 is a side plan, taken from FIG. 7 as indicated, of the present invention at optimum rest position in a users hand.

The second spatula plate 25 could also have tines 30 and degreasing apertures 32 but the preferred configuration is solid with straight, beveled cutting edges 44. The cutting edges 44 of the plates act as knives and the two plates can also be used to make two cuts simultaneously when slicing.

The handles 14 could be made of any thermo-resistant material although a hard wood is preferred. The handles 14 are affixed to the u-spring 11 and the plates 23,25 by the preferred means of a rivet 28 although a bolt or a screw could also be used. The ends of the handles 14 have holes to correspond with similar holes at the connecting ends of the plates 23,25 and the spring action u-clip 11 to receive the rivets 28 for connecting the plates to the handles 14 and the handles 14 to the u-clip 11.

What is claimed as new and desired to be protected by letters patent is set forth in the appended claims:

1. A multi-function adjustable grip barbeque tong assembly comprising:
   a) a spring clip, said spring clip being a resilient plate curved into a U-shape forming a straight first leg and a straight second leg connected by a radial fulcrum;
   b) first and second handles affixed to opposite ends of said spring clip;
   c) a first plate affixed to said first handle, said first plate having beveled cutting edges;
   d) a second plate affixed to said second handle, said first and second plates being substantially parallel; and
   e) an adjustable opening limiter wherein said first leg, said first handle and said first plate form a first spatula assembly, said first spatula assembly having a plurality of tines extending longitudinally and distally from said first plate and a plurality of recesses, each of said plurality of recesses having sharpened cutting edges and being positioned between a respective pair of said plurality of tines.

2. A tong assembly as recited in claim 1, wherein said second leg, said second handle, and said second plate form a second spatula assembly.

3. A tong assembly as recited in claim 2, wherein said second plate has beveled cutting edges.

4. A tong assembly as recited in claim 3, wherein said second plate is solid.

5. A tong assembly as recited in claim 2, wherein said spring clip includes said adjustable opening limiter interacting with said first leg and said second leg thereby controlling the degree of separation between said first and second spatula assemblies.

6. A tong assembly as recited in claim 5, wherein said spring clip has a first hole in said first leg and a corresponding second hole in said second leg.

7. A tong assembly as recited in claim 6, wherein said adjustable opening limiter comprises a threaded bolt inserted through said second hole and then said first hole of said spring clip and a locking nut adapted to screw onto said threads on an exterior portion of said spring clip.

8. A tong assembly as recited in claim 7, wherein said adjustable opening limiter further includes threads in first hole of said spring clip adapted to accommodate said threaded bolt.

9. A tong assembly as recited in claim 1, wherein said recesses are spaced in such a manner as to correspond with the rods on a barbeque grill allowing said tines to extend between and below the rods of the grill.

10. A tong assembly as recited in claim 1, wherein said first plate has one or more degreasing apertures.

* * * * *